United States Patent [19]
Bildgen

[11] Patent Number: 5,914,569
[45] Date of Patent: Jun. 22, 1999

[54] SWITCHING CONTROLLER AND CONTROL DEVICE FOR A LOW PRESSURE FLUORESCENT LAMP

[75] Inventor: Marco Bildgen, Aix-En-Provence, France

[73] Assignee: SGS-Thomson Microelectronics S.A., Saint Genis, France

[21] Appl. No.: 08/811,943

[22] Filed: Mar. 5, 1997

Related U.S. Application Data

[62] Division of application No. 08/490,277, Jun. 14, 1995.

[30] Foreign Application Priority Data

Jun. 15, 1994 [FR] France .................................. 94-07331

[51] Int. Cl.⁶ ...................................................... H05B 37/02
[52] U.S. Cl. ...................... 315/209 R; 315/291; 315/307; 315/DIG. 7; 315/224; 363/98; 363/134; 307/125
[58] Field of Search ............................... 315/209 R, 291, 315/307, DIG. 7, 219, 224; 363/98, 132, 134; 307/112, 113, 115, 116, 125, 126, 130, 131, 139, 140, 154, 157

[56] References Cited

U.S. PATENT DOCUMENTS

| | | | |
|---|---|---|---|
| 4,868,728 | 9/1989 | Nuns | 363/17 |
| 5,075,599 | 12/1991 | Overgoor et al. | 315/209 R |
| 5,187,414 | 2/1993 | Fellows et al. | 315/307 |
| 5,367,247 | 11/1994 | Blocher et al. | 323/222 |
| 5,382,881 | 1/1995 | Farkas et al. | 315/209 R |
| 5,500,792 | 3/1996 | Jeon et al. | 363/98 |
| 5,510,974 | 4/1996 | Gu et al. | 363/134 |
| 5,546,300 | 8/1996 | Lee et al. | 363/132 |
| 5,552,979 | 9/1996 | Gu et al. | 363/98 |

FOREIGN PATENT DOCUMENTS

| | | | |
|---|---|---|---|
| A-0 320 410 | 6/1989 | European Pat. Off. | H02M 7/538 |
| A-0 430 357 | 6/1991 | European Pat. Off. | H05B 41/39 |

OTHER PUBLICATIONS

French Search Report from French Patent Application 94 07331, filed Jun. 15, 1994.

*Primary Examiner*—Michael Shingleton
*Attorney, Agent, or Firm*—Wolf, Greenfield & Sacks, P.C.

[57] ABSTRACT

A control device for a fluorescent lamp comprises two independent circuits based on a power transistor and a switching control circuit, series-connected between a high voltage and the ground. The power transistor has a diode that is reverse mounted between its two electrodes. The switching control circuit comprises a circuit for the detection of a voltage at the terminals of the diode greater than a voltage reference value and a circuit for the detection of the integral of the current flowing in the transistor that is greater than a current reference value corresponding to the power of the lamp.

7 Claims, 3 Drawing Sheets

5,914,569

SWITCHING CONTROLLER AND CONTROL DEVICE FOR A LOW PRESSURE FLUORESCENT LAMP

This application is a division of application Ser. No. 08/490,277, filed Jun. 14, 1995, pending entitled SWITCHING CONTROLLER AND CONTROL DEVICE FOR A LOW PRESSURE FLUORESCENT LAMP, now Pending.

BACKGROUND OF THE INVENTION

1. Field of the Invention

The invention relates to control devices for a low-pressure fluorescent lamp.

2. Discussion of the Related Art

Fluorescent lamps contain gases (neon, argon) at low pressure. The electrical behavior of a fluorescent lamp is similar to that of a zener (avalanche) diode with a resistance in the gas that may become very low and negative after breakdown. Ions moving at high speeds lead the atoms of the gas to assume excited states in which they give out luminous lines.

A control device for the lamp is typically needed, comprising a current source. However, to avoid a migration of ions, the current discharges applied between two electrodes of the lamp should pass in one direction and then in the other, alternately. The practice has been to use an inductor as a discharge control device but the development of electronics has led to the use of control devices typically comprising two electronic switches based on power transistors supplied with DC high voltage and a current transformer to control these transistor-based control devices. A resonant circuit comprising an inductor and a capacitor applies an AC current to the fluorescent lamp. According to the prior art, the transformer is a saturation transformer that limits the current in the lamp by saturation of its magnetic core and leads to the switching of the switches of the control devices. The electronic switches generally use bipolar technology power transistors for the switching and parallel and reverse-connected diodes to let through the current during the alternations, and various protection elements such as diodes and capacitors.

These transformer devices are very bulky and costly because they require many components and allow only a very low degree of integration. Furthermore, the storage time of the bipolar transistors is a highly variable characteristic, for example ranging from 2 to 7 microseconds. This variation is not negligible as compared with the time at the end of which the transformer gets saturated for a current half-wave: it is about three microseconds for an alternation time of about ten microseconds. Hence, the time at the end of which the bipolar transistor goes off after saturation of the transformer in an alternation varies from 5 to 10 microseconds. This is very troublesome. In practice, the storage time of each transistor is measured at the end of its manufacture in order it may be classified in a group corresponding to a narrow range of values for use in a control device matched by means of resistors with this range of values. All this entails heavy penalties and is very costly.

SUMMARY OF THE INVENTION

One illustrative embodiment of the present invention relates to a switching control circuit for a low-pressure fluorescent lamp. The switching control circuit includes a power transistor, a diode reverse-mounted between two electrodes of the transistor, a circuit for the detection of the voltage at the terminals of the diode and of the transistor to activate the ON state of the transistor when the voltage is below a voltage reference value, and a circuit to measure the current flowing into the transistor to activate the OFF state of the transistor when the integral of the current is greater than a current reference value.

In another illustrative embodiment of the present invention, a low-pressure fluorescent lamp control device is provided that comprises two switching control circuits and a power transistor series-connected between a high voltage and the ground. An inductor, the low-pressure fluorescent lamp and a capacitor are series-connected between the midpoint of the two switching circuits and the ground. A starting capacitor (Cp) is designed in parallel on this lamp.

BRIEF DESCRIPTION OF THE DRAWINGS

Other characteristics and advantages of the invention will be apparent from the following description, given by way of a non-restricted indication of the invention, with reference to the appended drawings, of which.

MORE DETAILED DESCRIPTION

Figure 1:
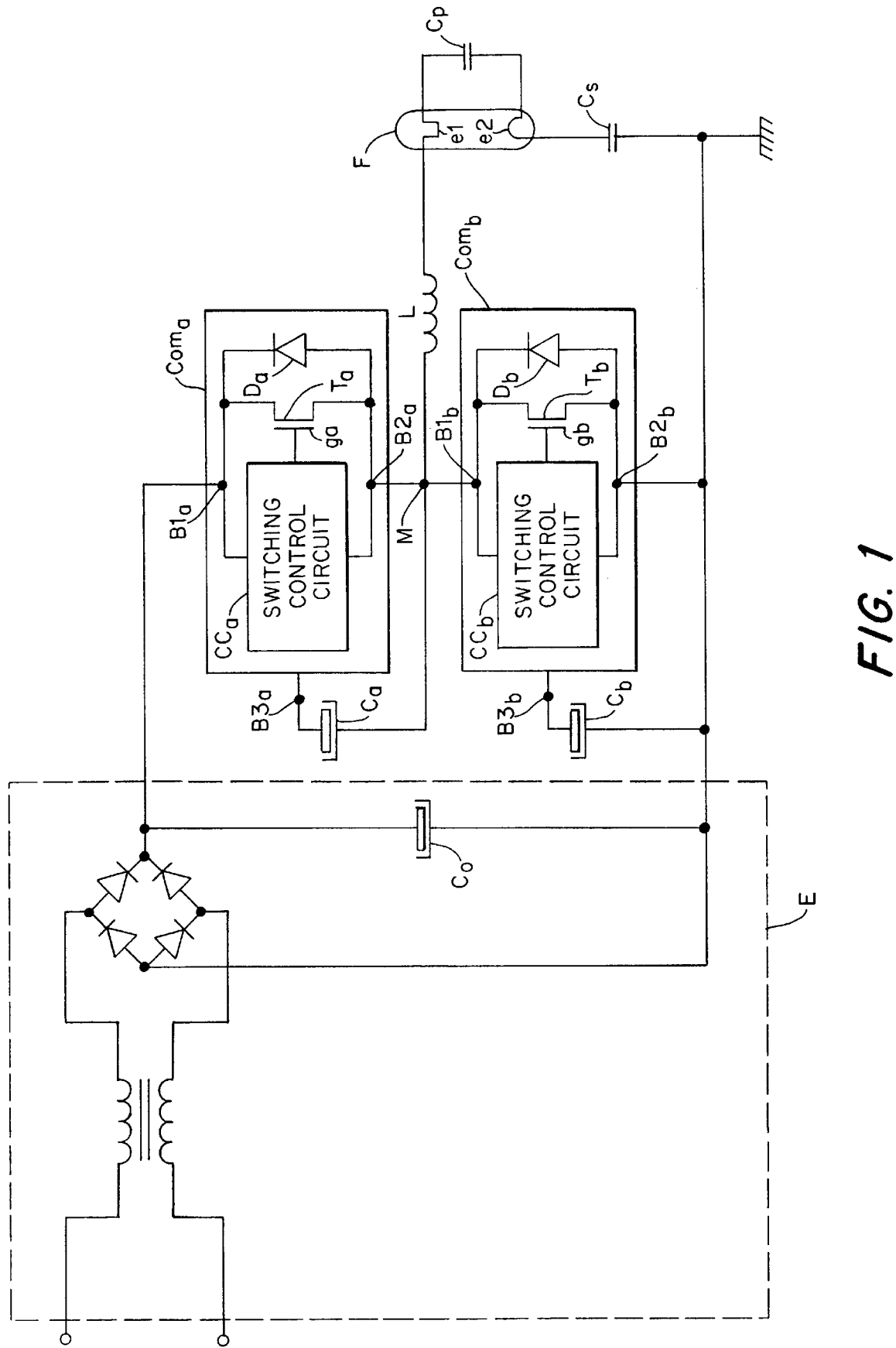
FIG. 1 is a block diagram of a control device of a low-pressure fluorescent lamp according to one embodiment of the invention.

FIG. 1 shows a control device according to the invention. It comprises mainly two circuits $Com_a$ and $Com_b$ series-connected between a high voltage and the ground. In the example, the high voltage is given by a supply stage E with rectifier and filtering capacitor C0 which maintain a DC supply high voltage of the order of 300 V.

The circuits $Com_a$ and $Com_b$ shall be described in detail hereinafter with reference to FIGS. 1 and 2. They comprise three external terminals referenced $B1_a$, $B2_a$, $B3_a$ for the circuit $Com_a$ and $B1_b$, $B2_b$, $B3_b$ for the circuit $Com_b$. The terminals $B1_a$ and $B2_a$ (and $B1_b$ and $B2_b$ respectively) are the connection terminals of the circuit. The terminal $B3_a$ (and $B3_b$, respectively) is a decoupling terminal for the logic supply of the circuit.

The terminals $B3_a$ and $B3_b$ are each connected to a decoupling capacitor $C_a$ and $C_b$ connected to the reference point of the circuit, namely $B2_a$ and $B2_b$. The role of these capacitors is to keep the level of the internal logic voltage of the circuits $Com_a$ and $Com_b$ when they have a null voltage between their connection terminals $B1_a$ and $B2_a$, $B1_b$ and $B2_b$.

Each of the circuits $Com_a$ and $Com_b$ comprises chiefly a power transistor $T_a$, respectively $T_b$ and its switching control circuit ($CC_a$ respectively $CC_b$) between the two connection terminals $B1_a$ and $B2_a$, respectively $B1_b$, and $B2_b$. The switching control circuit controls the gate ga, respectively gb of the associated power transistor. A diode $D_a$, respectively $D_b$ is placed in parallel and in reverse on the transistors $T_a$, respectively $T_b$.

The midpoint M between the two circuits $Com_a$ and $Com_b$ is connected to a terminal of an inductor L connected at the other terminal to a first electrode e1 of a low-pressure fluorescent lamp F. The other electrode e2 of the lamp is connected to a capacitor Cs connected to the ground. The inductor L, the lamp F and the capacitor Cs are therefore series-connected between the midpoint M and the ground, and form an oscillator circuit.

Finally, a starting capacitor Cp is parallel-connected to the lamp.

The general principle of operation of the device shall now be explained. The current flows into the lamp F in one direction and then in the other. This current flows, for example, in a first period through the power transistor $T_a$ which is then on, from the circuit $Com_a$ which is in the closed state: it has a null voltage between its terminals $B1_a$ and $B2_a$, all the high voltage being at the terminals of the other circuit $Com_b$. When the switching control circuit detects that there is sufficient current flowing in the transistor, it activates the open state of the circuit $Com_a$, in turning its power transistor $T_a$ off: the current in the lamp then goes into the other circuit $Com_b$ through the parallel and reverse-mounted diode Db. The voltage at the terminals of this diode becomes negative with reference to the reference point $B2_b$, of the circuit. The switching control circuit $CC_b$ detects this voltage drop at the terminals of the diode and activates the ON state of the associated power transistor $T_b$: the external resonant circuit will now cause a change in the direction of the current which could now go through the switch in the ON state, and so on and so forth.

The two circuits $Com_a$ and $Com_b$ then work independently, each one detecting a voltage drop at its terminals to go into the closed (or ON) state and ascertaining that there is sufficient current flowing between its terminals to go into the open (or OFF) state.

The criterion of current corresponds to the nominal power of the lamp to be controlled. Thus, a reference value of current is made to correspond with the nominal power of the lamp, and the current detection operation consists in measuring and comparing an integral of the current flowing into the transistor with a current reference value.

For the turning on of the lamp, it will be recalled that the element conventionally used is the starting capacitor Cp which short-circuits the lamp. The over voltage on the starting capacitor prompts the breakdown of the gas in the lamp and all the current then flows through the lamp: it is the starting capacitor that is then short-circuited and the resonance circuit then comprises only the capacitor in series with the lamp and the inductor.

Figure 2:
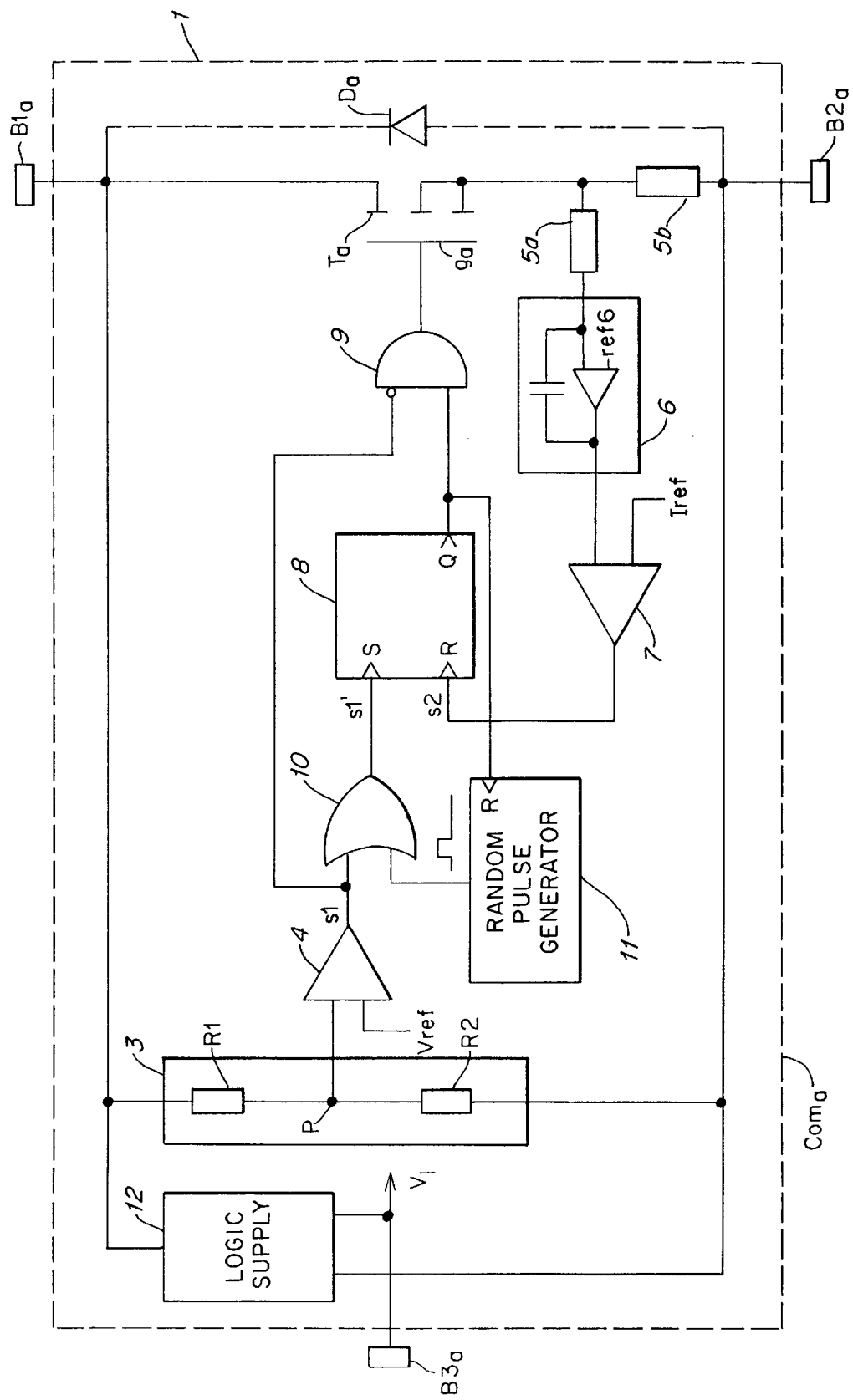
FIG. 2 is a detailed diagram of a switching control circuit according to one embodiment of the invention used in the control device shown in FIG. 1.

FIG. 2 is a detailed diagram of the circuit $Com_a$ comprising the switching control circuit $CC_a$ and the power transistor$_a$T according to the invention. It has three external connection terminals: two connection terminals $B1_a$ and $B2_a$ and a third decoupling terminal $B3_a$ of the logic supply $V_L$.

The power transistor $T_a$ is connected between the terminals $B1_a$ and $B2_a$ with a parallel and reverse-connected diode $D_a$. Thus, the drain of the transistor and the cathode of the diode are connected to the terminal $B1_a$ and the source of the transistor and the anode of the diode are connected to the terminal $B2_a$.

The switching control circuit comprises a circuit for the detection of a voltage at the terminals of the diode and of the transistor that is greater than or lower than a voltage reference value Vref and a circuit to measure the current flowing into the transistor to determine a current-related surface area greater or lower than a current reference value Iref.

The voltage detection circuit comprises a resistive divider 3 comprising, in the example, two resistive elements referenced R1 and R2 series-connected between the first terminal $B1_a$ and the second terminal $B2_a$. The resistive elements may be diffusions or a transistor in a state of saturation for example. This resistive divider is notably designed to reduce the voltage excursion between the two terminals for it may be 500 volts in the example, to reduce it to a logic level, for example in the range of 15 volts, that is acceptable by a logic circuit.

The midpoint P between the two resistive elements is connected to an input of a voltage comparator 4 which, at another input, receives a reference voltage Vref. In the example, it is sought to detect a practically null voltage: the voltage reference is a voltage close to zero volts.

The voltage comparator delivers, at output, a detection signal pertaining to a voltage greater than or lower than the voltage reference s1, which is used to control the gate of the power transistor $T_a$.

The current measurement circuit comprises a current bypass circuit comprising, in the example, two resistive charges. A first charge 5a is placed between the power transistor and the input of an integrator 6. Another resistive charge 5b is placed between the power transistor and the reference point $B2_a$.

Other bypass circuits may be envisaged. For example, since the power transistor is formed by millions of MOSFET cells, it is also possible to provide for a fourth terminal on this transistor to reroute the current by a few cells only: the ratio of the total current to the current rerouted in this way is indeed very precise. This fourth bypass terminal is then connected to a resistive charge in series with the integrator.

The integrator 6 may be a simple RC lowpass filter. It may also, as shown in FIG. 2, make use of an operational amplifier mounted as an integrator with one input receiving the current rerouted by the charge 5 and one input connected to a reference ref6 which conventionally depends on the voltage excursion on the first input, as is well known to those skilled in the art. Finally, a capacitor is parallel-connected to this first input and the output of the amplifier.

A comparator 7 receives the output of the integrator as well as a current reference value Iref, computed according to the nominal power of the lamp and as a function of the current rerouting charge. In one example, for a 7-watt lamp, the current reference value may be in the range of a hundred milliamperes according to the rerouting charge. The output of the current comparator 7 gives the current detection signal s2 which is used to control the gate of the power transistor $T_a$.

The signals s1 and s2 are applied to a logic circuit that prepares the voltage command of the gate. We have seen that it is necessary to turn the transistor off when an integral of the current through the transistor exceeds a current reference value, this information being given by the signal s2, and to turn the transistor on upon the detection of a null voltage at the terminals of the diode (hence of the transistor), this information being given by the signal s1.

In the example, the logic circuit comprises an RS type bistable flip-flop circuit with a one-setting input S, controlled by the signal for the detection of a voltage s1 and a zero-setting input controlled by the signal for the detection of current s2. In the preferred example of a MOSFET type N channel power transistor, it is necessary to have a voltage of about 15 volts on the gate to turn it on and about zero volts to turn it off. Thus, if a null voltage is detected, a logic voltage of the order of 15 volts is activated on the gate $g_a$ of the power transistor, and if a sufficient level of current is detected, a logic voltage of the order of zero volts is activated on the gate of the power transistor.

As a protective measure, it is preferable to be able to turn the transistor off if there should be a positive voltage at the terminal $B1_a$ while the current detection output is no longer at one (namely, when the current flows into the other switch). For this purpose, it is provided that the logic circuit will furthermore comprise a logic gate 9, which is an AND type logic gate in the example, to force in this case the gate g of the transistor to zero volts, irrespectively of the current detection output. In the example, the logic gate receives the output Q of the bistable flip-flop circuit at input and the reverse voltage detection signal /s1. The logic gate may, for example, have an inverter input or an inverter may be provided, series-connected between the output of the comparator and the input of this logic gate 9.

Finally, the logic circuit preferably has a starting circuit comprising a logic gate 10 and a random pulse generator 11. The logic gate 10 is, in the example, an OR gate receiving at input the detection signal pertaining to a voltage s1 and the output of the random pulse generator 11. This generator 11 delivers a pulse at the end of a certain random time after the voltage is turned on. The logic gate 10 delivers, at output, a signal s1' to control the one-setting input of the bistable flip-flop circuit 8. The purpose of this starting circuit is to be capable of enforcing the detection of voltage to the level corresponding to the detection of a null voltage when the pulse is sent, to oblige the switching control circuit to perform its control in the closed state (transistor oil). The value, for a device using two circuits $Com_a$ and $Com_b$ according to the invention, is that one of the two is enforced into the closed state the one for which the pulse will be first generated, to make the device start. If not, the voltage gets distributed between the two circuits $Com_a$ and $Com_b$ and the system does not start.

However, when a generator has sent its pulse first, the other one has to be off. According to the invention, this is done simply by sending the output Q of the flip-flop to a zero-setting input R of the generator. Since a switching half-period is of the order of 10 microseconds, it is provided that the pulse will occur within a greater period of time.

The random pulse generator may, for example, use a leakage current in a semiconductor junction, for which it is known that it varies from one integrated circuit to another, owing to the variations that are intrinsic to the manufacturing process and cannot be controlled, to charge a capacitor that delivers the random pulse. The leakage current may, for example, vary from one nanoampere to one milliampere. The occurrence of the pulse may thus take place randomly after 0.1 to 100 milliseconds following the turning on of the voltage.

Finally, a logic supply device 12 is designed to generate a logic voltage V1 of the order of 15 volts to activate the different logic circuits (integrator, comparator, etc.) and give the gate voltage of the order of 15 volts needed to turn the power transistor on.

In one embodiment, the diode which is parallel-mounted on the power transistor and reverse-mounted is a parasitic diode of the transistor, hence one that is internal to its structure, and the control circuit therefore controls, firstly, the voltage at the terminals of the diode (hence of the transistor) and the current flowing in the transistor.

Figure 3:
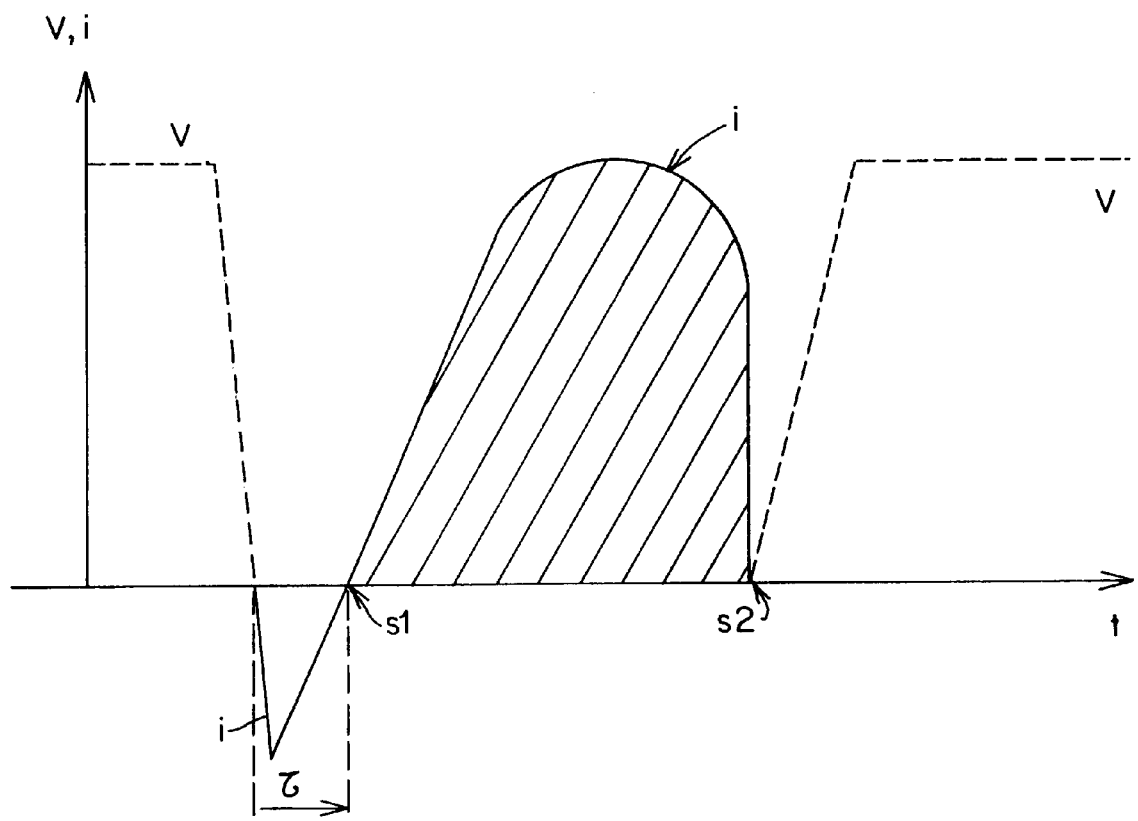
FIG. 3 shows the voltage and current curves at the terminals of a switching control circuit according to one embodiment of the invention, as used in the control device shown in FIG. 1.

FIG. 3 shows the voltage and current curves as a function of time for an alternation, for the control device of FIG. 1 using the circuits $Com_a$ and $Com_b$ shown in detail in FIG. 2.

The operation starts from an open state of the circuit $Com_a$ (with the power transistor $T_a$ or OFF): all the high voltage, and no current, is retrieved at the terminals of the transistor. Then, corresponding to the time when the other circuit $Com_b$ will go into the open state, the current of the lamp which must continue to flow somewhere, goes into the diode $D_a$ which is parallel-mounted on the transistor $T_a$ which is then reverse-biased: this corresponds to the negative part of the curve of the current in FIG. 3. The passage of the current into the diode causes the voltage at its terminals $B1_a$ and $B2_a$ to drop to a voltage close to zero (threshold voltage of the diode). This drop in voltage is detected by the detection circuit of the voltage which activates the ON state of the transistor: the circuit $Com_a$ goes to the closed state. At the same time, the other circuit $Com_b$ being in the open state, the oscillating circuit gets demagnetized: the negative current rises again gradually to zero. The current then changes its direction to become positive in the circuit $Com_a$ which is conducted by the power transistor $T_a$. This current is measured by the current measuring circuit. When current has passed to a sufficient extent, corresponding to the nominal power of the lamp, the circuit for the measuring of the current detects this occurrence (s2) and activates the OFF state of the transistor: the circuit $Com_a$ goes to the open state and all (or almost all) the high voltage is retrieved at its terminals (except for the threshold voltage of the diode of the other circuit $Com_b$ which is negligible).

According to the illustrative embodiment of the invention, all the voltage therefore is recovered at the terminals of either circuit $Com_a$ or $Com_b$ alternately and the alternations are controlled by the integration of the current through the transistor.

Preferably, to integrate only the positive part of the current, the transistor is activated into the ON state only after a short known time that corresponds to the demagnetizing of the resonant circuit of the lamp.

For this purpose, it is possible to use a monostable circuit at output of the comparator (not shown). And it is provided that the voltage detection signal also controls the start of the integration (not shown).

In another embodiment of the present invention, the circuit comprising the power transistor and its switching control circuit according to the invention advantageously take the form of a small three-pin integrated circuit. Two of them are needed for a control device according to this embodiment of the invention. They are not differentiated in the device for they are completely independent and insulated from one another. Internally they perceive only the current that flows in the transistor and the voltage at the terminals.

The only particular feature relates to the definition of the reference current which varies according to the nominal power of the low-pressure fluorescent lamp to be controlled (7, 12 or 18 watts, for example).

Having thus described at least one illustrative embodiment of the invention, various alterations, modifications and improvements will readily ocur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A control device for a low-pressure fluorescent lamp having a first input and a second input, the first input of the low-pressure fluorescent lamp being coupled to a second terminal of an inductor, the inductor further including a first terminal, the first and second inputs of the low-pressure fluorescent lamp respectively being coupled to first and second terminals of a capacitor, the first terminal of the inductor being coupled to a second terminal of a first power transistor and to a first terminal of a second power transistor, the first power transistor further including a first terminal coupled to a cathode of a first diode having an anode connected to the second terminal of the first power transistor, the second power transistor having a second terminal coupled to the second input of the lamp and to an anode of a second diode, the second diode further having a cathode coupled to the first terminal of the second power transistor, the control device comprising:

- a first switching control circuit having an input coupled to a first reference voltage, and a first output coupled to the first terminal of the inductor, wherein the first switching control circuit includes:
  - a first voltage detection circuit coupled to the first diode for detecting a first voltage across the first diode and having an output that provides a control signal to activate an on state of the first power transistor when the first voltage is below a first voltage reference value; and
  - a first current detection circuit that measures a first current into the first power transistor and activates an off state of the first power transistor when an integral of the first current is greater than a first current reference value; and
- a second switching control circuit having an input coupled to the first output of the first switching control circuit, and an output coupled to a second reference voltage and the second input of the low-pressure fluorescent lamp, wherein the second switching control circuit includes:
  - a second voltage detection circuit coupled to the second diode for detecting a second voltage across the second diode and having an output that provides a control signal to activate an on state of the second power transistor when the second voltage is below a second voltage reference value; and
  - a second current detection circuit that measures a second current into the second power transistor and activates an off state of the second power transistor when an integral of the second current is greater than a second current reference value.

2. The control device according to claim 1, further comprising:
- a first decoupling capacitor coupled between the first terminal of the first power transistor and the second terminal of the first power transistor; and
- a second decoupling capacitor coupled between the first terminal of the second power transistor and the second terminal of the second power transistor.

3. The control device of claim 1, in combination with the first and second power transistors and the first and second diodes.

4. The control device of claim 1, in combination with the first power transistor and the first diode, wherein the first switching circuit, the first power transistor and the first diode are on a same integrated circuit.

5. The control device of claim 2, further comprising:
- a first logic voltage generator circuit having a first input coupled to a first terminal of the first power transistor, a second input coupled to a second terminal of the first power transistor, and an output providing a logic reference voltage; and
- a second logic voltage generator circuit having a first input coupled to a first terminal of the second power transistor, a second input coupled to a second terminal of the second power transistor, and an output providing a logic reference voltage.

6. A fluorescent lamp assembly comprising:
- a low-pressure fluorescent lamp having first and second inputs;
- an inductor having a second terminal coupled to the first input of the low-pressure fluorescent lamp, and a first terminal;
- a starting capacitor having a first terminal coupled to the first input of the low-pressure fluorescent lamp, and a second terminal coupled to the second input of the fluorescent lamp;
- a first controller circuit including:
  - a first power transistor having a second terminal coupled to the first terminal of the inductor and a first terminal;
  - a first diode having a cathode coupled to the first terminal of the first power transistor and an anode coupled to the second terminal of the first power transistor; and
  - a first switching control circuit having an input coupled to a high voltage, and a first output coupled to the first terminal of the inductor, wherein the first switching control circuit includes:
    - a first voltage detection circuit coupled to the first diode for detecting a first voltage across the first diode and having an output that provides a control signal to activate an on state of the first power transistor when the first voltage is below a first voltage reference value; and
    - a first current detection circuit that measures a first current into the first power transistor and activates an off state of the first power transistor when an integral of the first current is greater than a first current reference value; and
- a second controller circuit including:
  - a second power transistor having a first terminal coupled to the first terminal of the inductor and a second terminal coupled to the second input of the lamp;
  - a second diode having a cathode coupled to the first terminal of the second power transistor and an anode coupled to the second terminal of the second power transistor; and
  - a second switching control circuit having an input coupled to the first output of the first switching control circuit, and an output coupled to a ground and coupled to the second input of the low pressure fluorescent lamp, wherein the second switching control circuit includes:
    - a second voltage detection circuit coupled to the second diode for detecting a second voltage across the second diode and having an output that provides a control signal to activate an on state of the second power transistor when the second voltage is below a second voltage reference value; and
    - a second current detection circuit that measures a second current into the second power transistor and activates an off state of the second power transistor when an integral of the second current is greater than a second current reference value.

7. The fluorescent lamp assembly of claim 6, wherein the first and second switching control circuits are integrated circuits.

* * * * *

UNITED STATES PATENT AND TRADEMARK OFFICE
CERTIFICATE OF CORRECTION

PATENT NO. : 5,914,569
DATED : June 22, 1999
INVENTOR(S): Marco BILDGEN

It is certified that error appears in the above-identified patent and that said Letters Patent is hereby corrected as shown below:

Column 1, line 5,

This application is a division of application serial no. 08/490,277, filed June 14, 1995, entitled SWITCHING CONTROLLER AND CONTROL DEVICE FOR A LOW PRESSURE FLUORESCENT LAMP, now Pending.

Signed and Sealed this

Ninth Day of November, 1999

Attest:

Q. TODD DICKINSON

Attesting Officer

Acting Commissioner of Patents and Trademarks